United States Patent [19]

Niss

[11] Patent Number: 5,439,146
[45] Date of Patent: Aug. 8, 1995

[54] DISPENSING DEVICE FOR DISPENSING FLUID SUBSTANCES SUCH AS MUSTARD, KETCHUP, AND THE LIKE

[76] Inventor: Jan-Anders Niss, Smultronvägen 1, Malung S-782 34, Sweden

[21] Appl. No.: 162,120
[22] PCT Filed: May 19, 1992
[86] PCT No.: PCT/SE92/00326
  § 371 Date: Dec. 13, 1993
  § 102(e) Date: Dec. 13, 1993
[87] PCT Pub. No.: WO92/22234
  PCT Pub. Date: Dec. 23, 1992

[30] Foreign Application Priority Data

Jun. 12, 1991 [SE] Sweden .................. 9101790

[51] Int. Cl.⁶ .................. B65D 37/00
[52] U.S. Cl. .................. 222/207; 222/213
[58] Field of Search .......... 222/55, 146.6, 207, 222/213, 214, 181, 508, 517; 62/389, 396, 399

[56] References Cited

U.S. PATENT DOCUMENTS

| | | | |
|---|---|---|---|
| 2,094,707 | 10/1937 | Jones | 251/10 |
| 2,645,247 | 7/1953 | Fechheimer | 137/747 |
| 2,742,191 | 4/1956 | Corsaw | 222/181 |
| 3,083,543 | 4/1963 | Stanton | 62/399 |
| 3,224,650 | 12/1965 | Willits, Jr. | 222/207 |
| 3,626,709 | 12/1971 | Yuza | 222/55 |
| 3,645,423 | 2/1972 | DeGraw | 222/213 |
| 4,603,793 | 8/1986 | Stern | 222/105 |
| 4,796,782 | 1/1989 | Wales et al. | 222/55 |

FOREIGN PATENT DOCUMENTS

| | | | |
|---|---|---|---|
| 2082789 | 12/1971 | France. | |
| 3802682 | 8/1988 | Germany. | |
| 870743 | 3/1988 | Norway. | |
| 399804 | 3/1978 | Sweden. | |
| 2128166 | 4/1984 | United Kingdom | 222/55 |
| 2180632 | 4/1987 | United Kingdom | 62/389 |
| WO91/01255 | 2/1991 | WIPO. | |

Primary Examiner—Andres Kashnikow
Assistant Examiner—Philippe Derakshani
Attorney, Agent, or Firm—Jacobson, Price, Holman & Stern

[57] ABSTRACT

A dispensing device for flowing substances comprises a tube (19) of flexible material adapted to receive the substance in question from a conduit (13) and a valve arrangement (20) for regulating flow of substance from the tube out through a discharge opening (21). The valve arrangement has two or more valve parts (23), which are adapted to each other so as to in a first relative position shut the flow past the valve and in a second relative position open for flow therethrough. A cooling device (10) is arranged along at least a part of the conduit (13) for cooling the conduit and the substance located therein, so that particularly in the case of food substances a degradation thereof is avoided.

20 Claims, 6 Drawing Sheets

DISPENSING DEVICE FOR DISPENSING FLUID SUBSTANCES SUCH AS MUSTARD, KETCHUP, AND THE LIKE

BACKGROUND OF THE INVENTION

This invention relates to a dispensing device for flowing substances.

There is a great need of efficient dispensing devices for various different types of flowing substances. Food products, such as mustard, ketchup, dressings and so on within the restaurant and kiosk business, cream, butter creams, jams and so on within the bakery business, liquid soap and other cleaning products and so on, may be mentioned as examples. The dispensing devices known are affected by drawbacks with respect to the valve arrangement for regulating flow of substance and the operating means for the valve arrangement. More exactly one problem resides in obtaining an acceptable compromise with respect to tightness in closed position and easiness with respect to the power required for dispensing, i.e. the power or force required for deforming the flexible tube and operating the valve arrangement. It is namely here assumed that operating the valve arrangement and by that controlling the very dispensing is carried out by the operator pressing the flexible tube together by his hand. An additional problem of known constructions of the valve arrangement is that they are not particularly well suited for such situations in which there is always an overpressure in a conduit or container upstream of the flexible tube generated by a pump controlled by means of a pressure sensor.

The handling now used for food products of additive character for the food industry, e.g. bakeries etc., and the restaurant business is affected by several deficiencies. Thus, it is today usual that the containers containing the food product in question are located in a position at room temperature for hours, or days, or even weeks before the content of the containers has been consumed. Furthermore, such considerable lengths of time also often pass between thoroughly cleaning of the containers and the dispensing devices used. Such extended dwell times of food products at room temperature give rise to a rapid increase of micro organisms harmful to humans. It is true that attempts are made to reduce this increase by admixing considerable quantities of pesticides against the micro organisms in question to food products in question. However, it is today a nearly unanimous opinion within the staff of medical researchers within this field that such pesticides are considerably more harmful to the human organism than expected before. When the content of pesticides is reduced or such means are totally eliminated, an even more rapid increase of micro organisms is created.

BRIEF SUMMARY OF THE INVENTION

The object of the present invention is to provide means to remedy to the problems and deficiencies discussed above. The invention is with respect to the dispensing device characterized by a valve arrangement consisting of two or more valve parts adapted to each other for reliable closing and opening whereby a comparatively reduced power consumption for the opening function is achieved, if the valve parts during opening move at least partially or more in a greater degree laterally with respect to the flowing direction of the substances.

A dispensing arrangement comprising such a dispensing device is primarily characterized in that a cooling device for cooling the conduit and thereby the substance located therein is arranged along at least a part of the conduit between the dispensing device and the substance container. Unacceptable conditions for the food substance are thereby reduced to a maximum extent, and in connection therewith a further cooling device may be provided for the substance container and integrated with the container or adapted for application thereon or constructed as a room receiving the container, e.g. a refrigerator. Such a construction means that a maximum portion of the substance in the dispensing arrangement is kept cooled. In spite of the possibility that the container is placed at a considerable distance from the dispensing place, i.e. the conduit has a very great length, unacceptable degeneration of the food substance may be avoided by efficient cooling of the main part of the length of the conduit. It is preferred that the conduit is subjected to cooling as close to the dispensing device as possible.

BRIEF DESCRIPTION OF THE DRAWINGS

With reference to the appended drawings, below follows a detailed description of an example of a preferred embodiment of the invention wherein:

In the drawings:

FIG. 1 is a schematic perspective view illustrating the dispensing arrangement according to the invention at a place of work in a food or restaurant kiosk or the like;

DETAILED DESCRIPTION OF A PREFERRED EMBODIMENT

Figure 1:
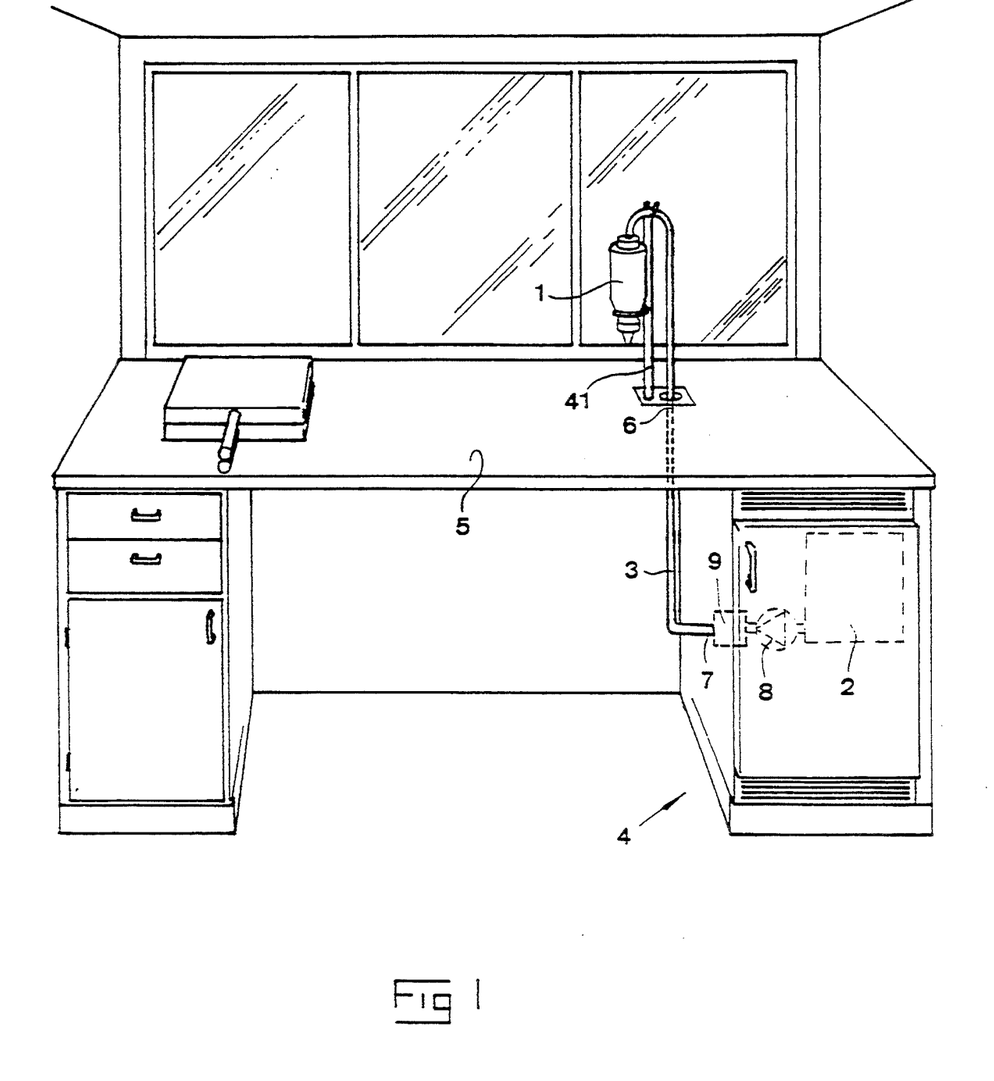

An arrangement for dispensing flowing substances, in particular food products, such as mustard, ketchup etc., is schematically illustrated in FIG. 1 and comprises a dispensing device 1, a container 2 for the substance in question and a conduit 3 extending between the container and the dispensing device. A cooling device is arranged along at least a part of the conduit for cooling the conduit and thereby the substance located therein and will be discussed more closely with reference to FIGS. 2-4. However, it should here be mentioned that it is preferred that the cooling device extends along as great a part as possible of that portion of the conduit 3 which is located in a position at room temperature.

As it also appears from FIG. 1, it is preferred that there is also a further cooling device 4 for the container 2 and integrated with the container 2 or constructed for application thereon or as indicated in FIG. 1 constructed as a room receiving the container, for instance a refrigerator.

The conduit 3 is according to FIG. 1 intended to extend from the container 2 located in the refrigerator 4 to the dispensing device 1 while passing through an opening in the work desk top 5. The cooling device for the conduit 3 discussed above extends preferably at least between the point 6 close to the work desk top 5 and the point 7 close to the refrigerator 4. The cooling device could extend all the way to the dispensing device 1 and also into the refrigerator for connection to the container 2.

As appears from FIG. 1, a pump 8 is arranged to transport the substance from the container 2 to the dispensing device 1 through the conduit 3, and in this conduit a pressure sensor 9 is arranged upstream of the pump 8 and interrupts the function of the pump on reaching a certain pressure level and starts the pump on falling below a certain pressure level. Although it is not necessary, it is preferred that the pump 8 and the pressure sensor 9 are located inside the refrigerator 4.

Figure 2:
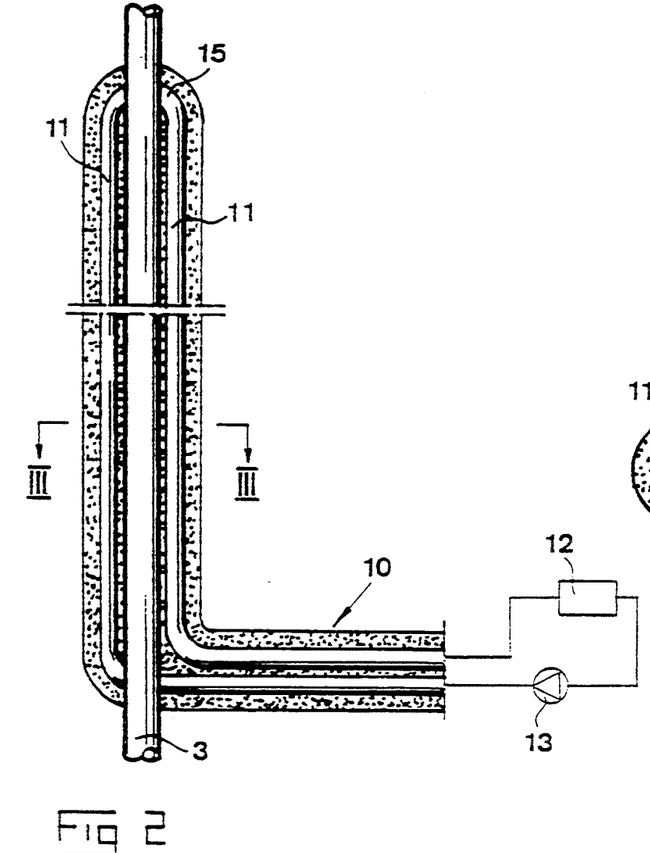
FIG. 2 is a partially cross-sectional detailed view illustrating the construction of a conduit which is a part of the dispensing arrangement.
Figure 3:
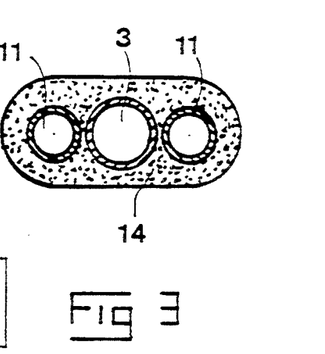
FIG. 3 is a cross-sectional view taken along the line III—III in FIG. 2.

It is illustrated in FIGS. 2 and 3 how the cooling device generally indicated by 10 for the conduit 3 comprises channels 11 for a coolant extending along the conduit. These channels 11 are more exactly connected to a cooling means 12, through which the coolant circulates by means of a pump 13 located in the coolant circuit such as schematically indicated in FIG. 2.

The conduit 3 and the coolant channels 11 are integrated into an elongate and flexible conduit/channel combination, which accordingly may be installed in the premises in question in a comparatively easy way also in case of a considerable distance between the dispensing device 1 and the container 2. As shown in FIG. 3 the conduit 3 and the channels 11 may be molded into or in another way embedded in any form of fundamental or molded mass 14 while forming a comparatively flat element. In the embodiment shown in FIG. 2, i.e. when the supply as well as the return of the coolant extend along the conduit 3 a suitable transition has to be arranged beside the conduit 3 at one end of the cooling device, such as indicated at 15. It is of course preferred that the material 14 is heat insulating.

Figure 4:
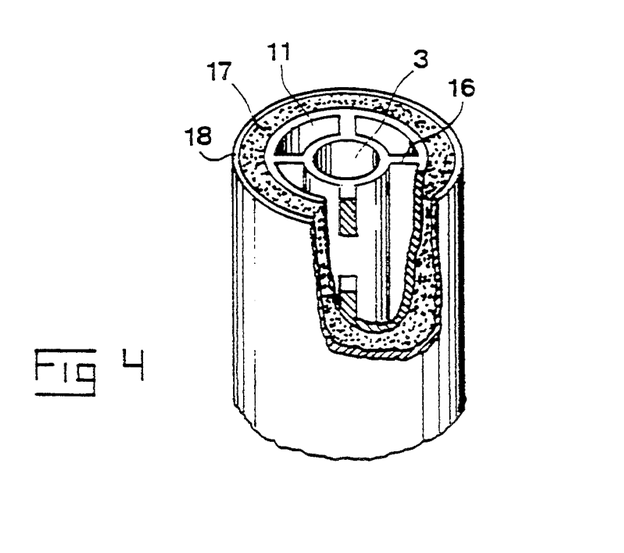
FIG. 4 is a partially cross-sectional perspective view of a portion of an alternative conduit construction.

An alternative embodiment of the combination of conduit 3 and coolant channels 11 is illustrated in FIG. 4. As distinguished from the preceding case, where the coolant channels are located laterally to a conduit 3, the conduit 3 and the channels 11 are in FIG. 4 concentric and more exactly so that the conduit 3 is the central one while the channels 11 are located externally of the conduit 3. In the case of more than two channels 11 a first group thereof may be utilized for supply of coolant while a second group thereof may be utilized for return. It also is shown in FIG. 4 how the conduit 3 and the channels 11 could be made out of one piece by for instance extrusion of a plastic material by the presence of bridges 16, which may be substantially radially directed, between portions defining the conduit 3 and the channels 11. There is suitably an insulating layer 17 externally of the coolant channels and outermost a protecting shell 18. Coolant channel transitions corresponding to the one indicated by 15 in FIG. 2 are of course also present in the embodiment according to FIG. 4 at one end of the cooling device 10.

The construction of the dispensing device 1 appears more closely from FIGS. 5-8. This comprises a tube 19 made of a flexible material, such as plastic or rubber, which is adapted to receive the substance in question from the conduit 3, and a valve arrangement 20 for regulating a flow of substance from the tube 19 out through a discharge opening 21, the valve arrangement 20 being arranged to be actuated for flow regulation by pressure action (arrows 22 in FIG. 6) on the tube 19.

The valve arrangement 20 comprises in the example shown four valve parts 23, which are adapted to each other so as to in a first relative position (FIGS. 5 and 8) shut the flow past the valve parts and in a second relative position (FIG. 6) open for such a flow. The valve parts 23 are connected to operating means 24 for mechanically operating the valve parts 23 for opening on pressure action on the flexible tube 19.

Elastic return parts are present for returning the valve means 23 into the closing position. These return means may be constituted by the flexible tube 19 and/or other elastic means, e.g. an elastic parts 25 extending around the valve means 23.

The tube 19 may be utilized as an elastic return means as a consequence of the inherent tendency thereof to take back its original shape if the ends of the operating members 24 remote from the valve parts 23 are received in seats 26 arranged on the inside of the flexible tube 19. The seats 26 may for example be formed by the fact that the tube 19 on the inside has a substantially axially directed circular rib, which between itself and the adjacent surface on the inside of the tube 19 forms a space.

The elastic parts 25 around the valve means 23 has the character of an annular sleeve which grasps around the valve parts 23 and press them radially inwardly to bear against each other. The elastic means 25 will accordingly counteract the movement radially outwardly of the valve parts, i.e. away from each other.

As it appears from the figures in the drawings, the elastic means 25 and the valve part 23 may have mutually engaging portions so as to obtain a determination of their mutually positions. These portions have the character of extensions/recesses. Recesses 27 are in this example arranged in the valve parts 23 (FIG. 7), while an extension 28 fitting into the recesses 27 is arranged on the elastic means 25. The recesses may for example together form a circular slot, in which case the extension 28 on the elastic means 25 is made of an annular bead extending inwardly.

The operating means 24 are constituted by elongate operating members 24 rigidly connected to the valve parts 23 and located inside the flexible tube 19 so as to be actuated thereby on pressure action on the tube. As distinguished from what has been described in FIG. 5 concerning the seats 26, such seats 26 may in an alternative embodiment shown in FIG. 8 be completely omitted and means 29 for synchronizing the movements of the valve parts 23 be provided instead. By "synchronizing" is meant that all valve parts shall be brought to simultaneously and to an identical extent describe opening as well as closing movements, i.e. always be located in an identical position. The synchronizing means 29 are more exactly constituted by actuating means 29, which in this example are four in number, so that accordingly each operating member 24 is rigidly connected to such an actuating means 29. Each actuating means 29 is arranged to function actuating upon one of the adjacent operating members and has also a curved shape shown in FIG. 8, so that when two diametrically opposite operating members 24 are pressed towards each other without any influence upon the other operating members the means 29 will ensure that not only the two actuated operating members 24 but also the two other ones move inwardly and to the same extent as the actuated operating members, which produces a synchronized movement of the valve parts 23.

Figure 8:
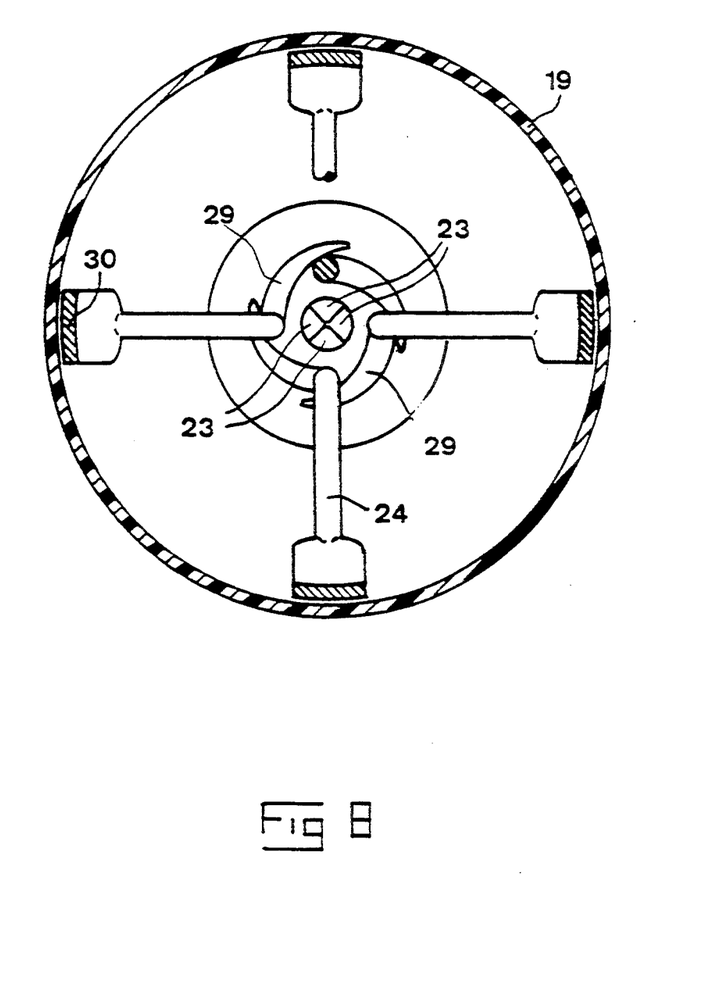
FIG. 8 is a partially fragmented cross-sectional view taken along line VIII—VIII of FIG. 5 illustrating the valve means and operating means therefor in a somewhat modified construction and also means for synchronizing the movements of the valve parts.

As appears from FIG. 8 the operating members may along their portions intended to be actuated by the tube 19 be, as indicated at 30, of a comparatively flat and curved construction in correspondence with the curve of the tube 19 for a large surface contact between the inside of the tube 19 and the operating members.

Figure 6:
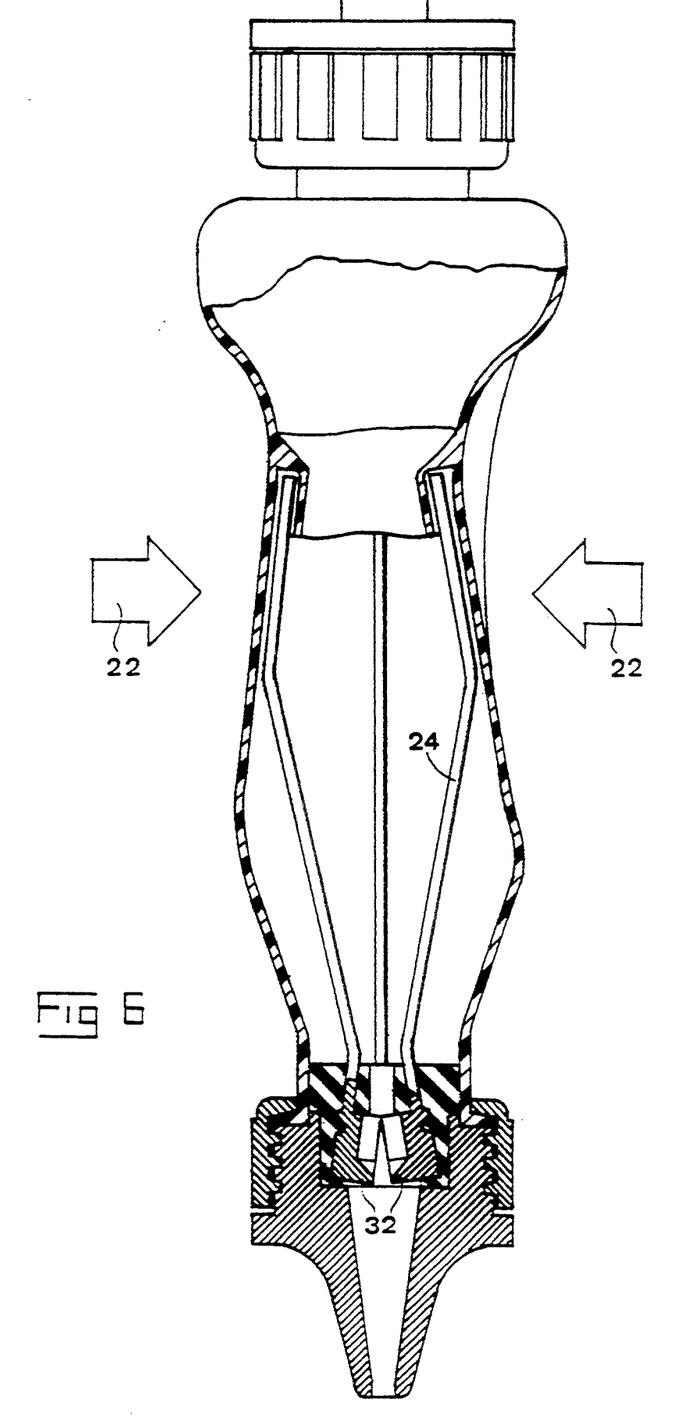
FIG. 6 is a view similar to FIG. 5 but illustrating a tube included in the dispensing device in a compressed condition.

The valve means 23 in the closed position bears against each other along bearing or abutment surfaces 31 and when opening the valve parts 23 are adapted to pivot with respect to each other, so that the ends 32 of the valve parts located downstream as seen in the dispensing direction move away from each other (see FIG. 6). The ends of the valve parts located upstream are arranged to bear laterally towards each other while the valve parts 23 pivot with respect to each other.

Figure 7:
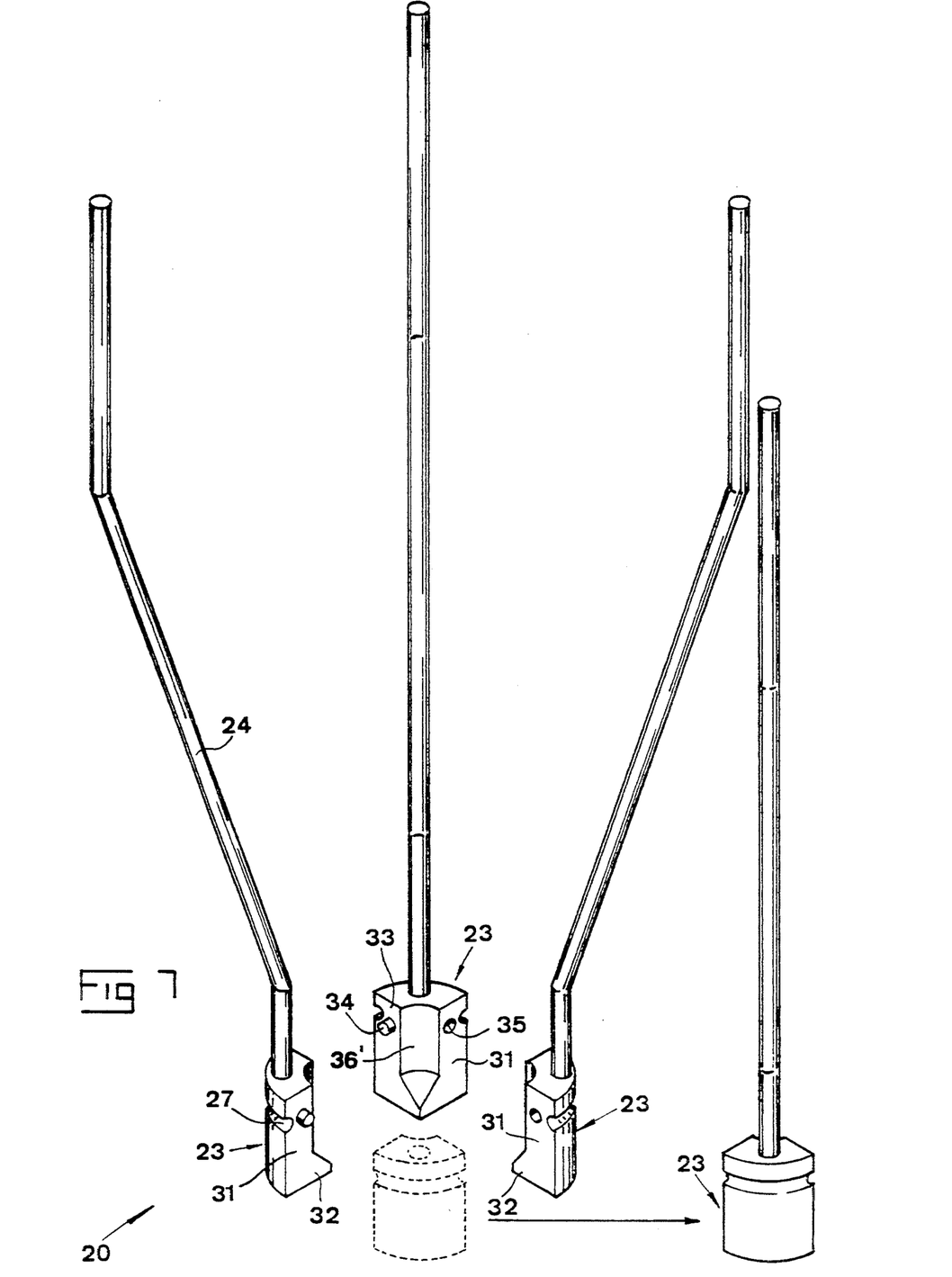
FIG. 7 is a perspective exploded view illustrating the valve means and operating means therefor.

Adjacent valve parts 23 may as indicated in FIG. 7 engage with each other through form locking means, e.g. extensions/pins 34 and recesses 35. According to a suitable embodiment then every single valve part 23 has a pin 34 for engagement with a recess 35 in an adjacent value means intended to match with the pin of the other adjacent valve parts.

The valve parts 23 form in their closed position a substantially circular cross section configuration. Every single valve part then forms a sector of a circle of this circular configuration.

The valve parts 23 form in their closed position together a channel 36, which at the upstream ends 33 of the valve means 23 emerges into the tube 19 but ends before the downstream ends 32 of the valve parts, which in the closed position form a tight closure by the mutual abutment thereof. This channel 36 is as appears most clearly from FIG. 7 formed by a recess 36' located inwardly on each valve part 23, which however ends before the lower end of the valve means.

Figure 5:
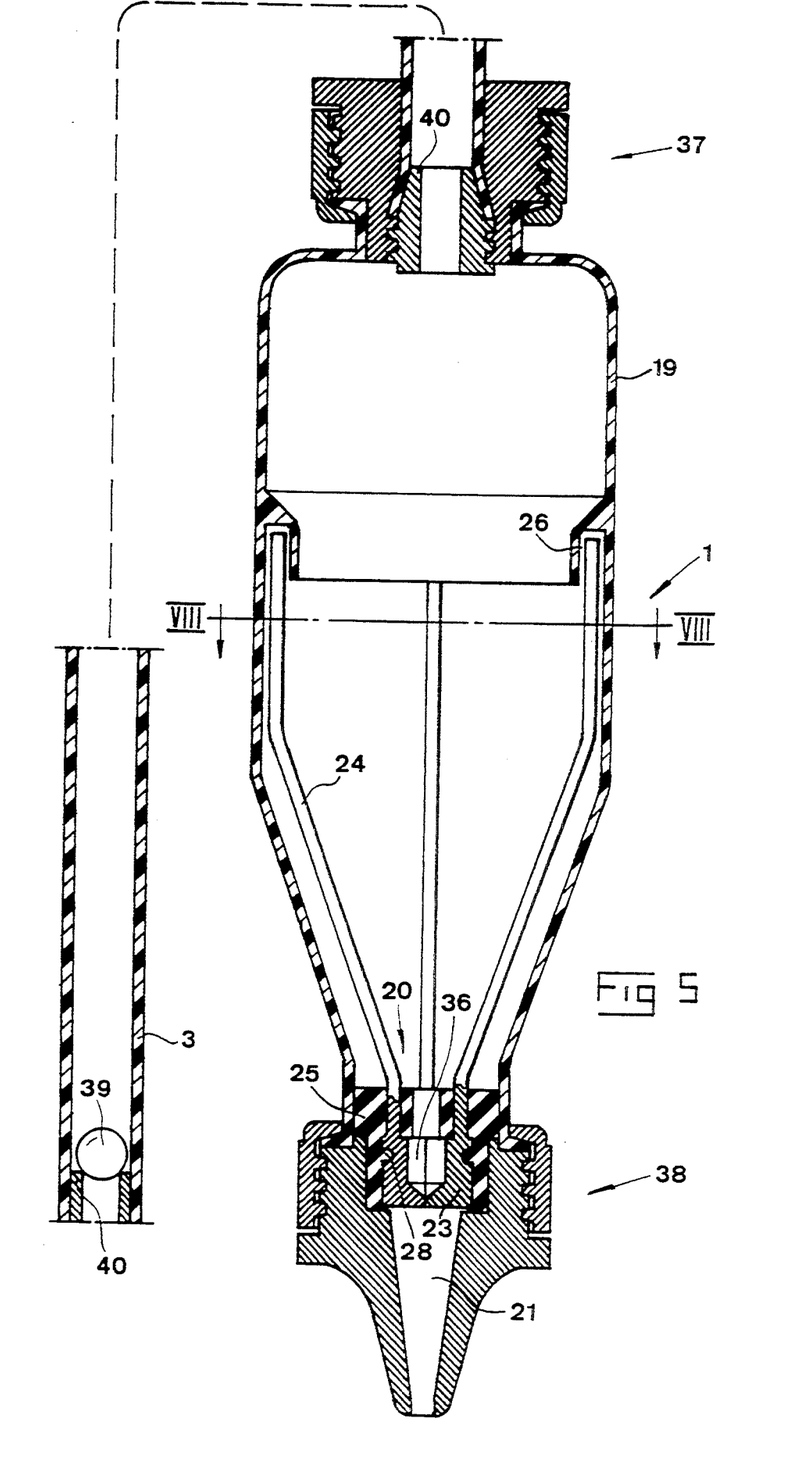
FIG. 5 is an enlarged cross-sectional view illustrating the dispensing device of the invention.

FIGS. 5 and 6 show the upper end of the tube 19 is braced in a nipple-like device 37, which also functions as a sealing connection to the conduit 3. The lower end of the tube 19 is in an analogous way sealingly braced to a part 38 defining the discharge opening 21, which part in this example has a seat for receiving the elastic parts 25 and the set of valve parts 23 located radially inwardly thereof.

FIGS. 5 and 6 also show how the elastic means 25 may at the top have a rib extending substantially radially inwardly through which bores are provided in which the operating members 24 of the valve means extend.

The conduit 3 may suitably have one or several balls 39 or differently constructed bodies arranged therein, the function of which is to pass through the conduit to remove material depositions therefrom. Means 40 are arranged in places remote from each other, e.g. close to the dispensing device 1 and the pressure sensor 9, so that balls 39 are not able to pass these means. The balls 39 may be brought to pass through the conduit to an fro by alternately reversing the pump 8, and it is suitable that the pump 8 in connection therewith transports a cleaning fluid through the conduit.

The operator may when using the arrangement described by means of the dispensing device 1 optionally dispense the flowing substance by pressing the tube 19 by his hand. The pressure sensor 9 detects the pressure reduction in the conduit 3 and starts the pump 8, which pumps the substance in the direction towards the dispensing device 1 and which increases the pressure in the conduit 3 until the pressure sensor inactivates the pump. That part of the substance which then is located in the conduit 3 is efficiently cooled through the cooling device 10 described and the substance in the container 2 is also kept efficiently cooled in the refrigerator 4 or by means of the cooling device in question otherwise constructed. A dispensing device 1 may during periods of inactivity be suspended in a suitable support 41.

It is evident that the invention is in no way restricted only to the embodiment described but many modifications are possible within the scope of the appended claims. It may for example be mentioned that the valve parts 23 may be fewer as well as more in number than four as long as the number is at least two. Furthermore, the operating members 24 and possibly also the valve parts 23 may be constructed as one piece with the tube 19.

I claim:

1. A dispensing device for flowable substances, comprising:
    a tubular member of flexible material having an inlet end adapted to receive a flowable substance from a conduit means through which said substance is conducted to said tubular member, and an outlet end;
    a discharge opening connected to said outlet end of said tubular member;
    valve means for regulating flow of said substance from said tubular member out through said discharge opening, said valve means being disposed in said outlet end of said tubular member and comprising a plurality of valve parts mounted in cooperatively engaging relationship with each other for relative movement with respect to each other between a closed position for cutting off flow through said valve means and an open position for facilitating flow through said valve means, bearing surfaces on said valve parts for bearing against adjacent valve parts in said closed position, pivot means for pivotally mounting said valve parts for pivotable movement thereof with respect to each other, upstream ends on said valve parts, downstream ends on said valve parts for sealing engagement with each other in said closed position, channel portions on said valve parts forming a channel between said downstream and upstream ends of said valve parts and emerging into said tubular member at said upstream ends of said valve parts, said upstream ends of said valve parts being arranged to bear against each other during pivoting movement of said valve parts with respect to each other to maintain said channel communicating with said tubular member at all times; and
    means for actuating said valve parts to produce said pivoting movement by pressure on said tubular member for controlling said flow regulation of said valve means.

2. The dispensing device as claimed in claim 1 and further comprising:
    operating means connected to said valve parts and engageable with said tubular member so that said pressure on said tubular member displaces said operating means and said valve parts for opening said valve means.

3. The device as claimed in claim 1 and further comprising:

elastic return means for resiliently urging said valve parts toward said closed position.

4. The device as claimed in claim 2 and further comprising:

elastic return means for resiliently urging said valve parts toward said closed position.

5. The device as claimed in claim 3 wherein:

said return means comprises an integral resiliency in said tubular member causing said tubular member to return to a normal condition with no pressure on said tubular member for urging said valve parts into said closed position.

6. The device as claimed in claim 4 wherein:

said return means comprises an inherent resiliency in said tubular member causing said tubular member to return to a normal condition with no pressure on said tubular member for urging said valve parts into said closed position.

7. The device as claimed in claim 1 and further comprising:

synchronizing means operatively associated with said valve parts for synchronizing movements of said valve parts.

8. The device as claimed in claim 2 and further comprising:

synchronizing means operatively associated with said valve parts for synchronizing movements of said valve parts.

9. The device as claimed in claim 3 and further comprising:

synchronizing means operatively associated with said valve parts for synchronizing movements of said valve parts.

10. The device as claimed in claim 4 and further comprising:

synchronizing means operatively associated with said valve parts for synchronizing movements of said valve parts.

11. The device as claimed in claim 5 and further comprising:

synchronizing means operatively associated with said valve parts for synchronizing movements of said valve parts.

12. The device as claimed in claim 6 and further comprising:

synchronizing means operatively associated with said valve parts for synchronizing movements of said valve parts.

13. The device as claimed in claim 2 wherein:

said operating means comprises elongated operating members connected to said valve parts and located inside said tubular member for actuation by said pressure on said tubular member.

14. The device as claimed in claim 13 and further comprising:

distal ends on said operating members remote from said valve parts; and seat means on the inner surface of said tubular member for receiving said distal ends of said operating members in engaging relationship therewith.

15. The device as claimed in claim 1 wherein:

said pivot means comprises pin means extending from one of said bearing surfaces of each of said valve parts and recess means on the other of said bearing surfaces of each of said valve parts for receiving a respective pin means extending from an adjacent valve part.

16. The device as claimed in claim 1 wherein:

said valve parts together form a substantially circular cross-sectional configuration.

17. The device as claimed in claim 15 wherein:

said valve parts together form a substantially circular cross-sectional configuration.

18. The device as claimed in claim 3 wherein:

said return means comprises an elastic element surrounding said valve parts in engaging relationship therewith for resiliently urging said valve parts toward said closed position.

19. A dispensing device for flowable substances comprising:

a tubular member of flexible material having an inlet end adapted for receiving a flowable substance from a conduit means through which said substance is conducted to said tubular member, and an outlet end;

a discharge opening connected to said outlet end of said tubular member;

valve means for regulating flow of said substances from said tubular member out through said discharge opening, said valve means comprising a plurality of valve parts mounted in cooperating mating relationship with respect to each other for relative movement between a closed position for cutting off flow through said valve means and an open position for facilitating flow through said valve means; and elongate operating members connected to said valve parts and located inside said tubular member for mechanically operating said valve means towards said open position by pressure on said tubular member.

20. The dispensing device as claimed in claim 19 and further comprising:

distal ends on said operating member remote from said valve parts; and seats on the inner surface of said tubular member for receiving said distal ends of said operating members.

* * * * *